Sept. 6, 1955 J. GELLER ET AL 2,717,232
DEHYDRATION AND FRACTIONATION OF CRUDE PYRIDINE
Filed May 12, 1951
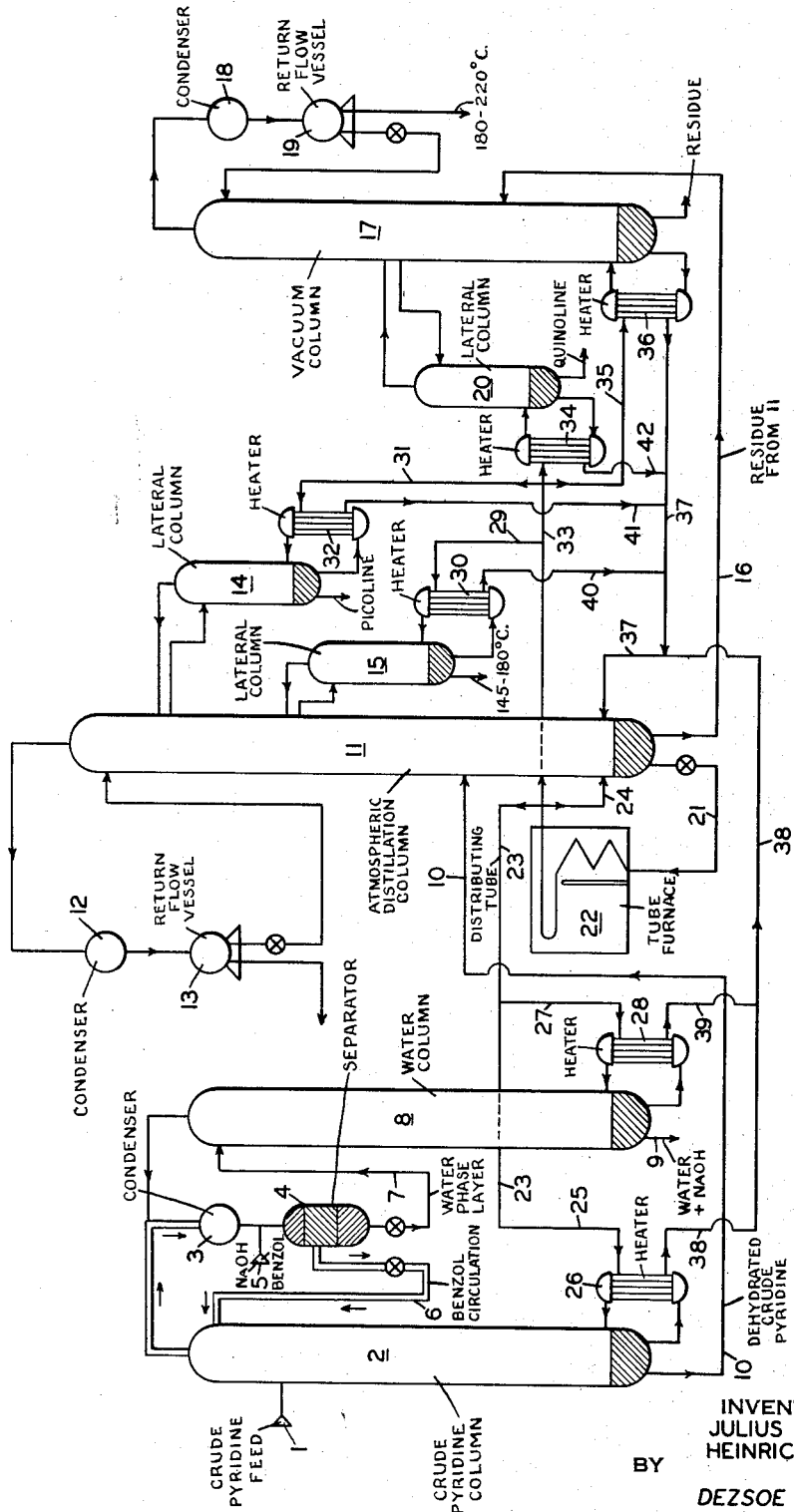
INVENTORS
JULIUS GELLER
HEINRICH RATTE
BY
DEZSOE STEINHERZ.
ATTORNEY

United States Patent Office 2,717,232
Patented Sept. 6, 1955

2,717,232

DEHYDRATION AND FRACTIONATION OF CRUDE PYRIDINE

Julius Geller, Bad Homburg vor der Hohe, and Heinrich Ratte, Frankfurt am Main, Germany, assignors to Rutgerswerke-Aktiengesellschaft, Frankfurt am Main, Germany Application May 12, 1951, Serial No. 225,952

Claims priority, application Germany May 13, 1950

6 Claims. (Cl. 202—40)

It has been known from the art to separate water from crude aqueous pyridine by distilling off the low-boiling constituents in a fractionating column, whereby, as a mixture of approximately constant boiling point, the water is also removed together with the first runnings. Separation of pyridine from the distillate thus obtained is usually brought about by treatment with soda lye or caustic soda. It has also been known to dehydrate the water-containing crude pyridine by treating it with caustic soda or soda lye.

In carrying out the known processes, relatively large quantities of soda lye or caustic soda are required. The amounts needed are particularly high, because the soda lye can only be diluted from about 45% to about 15–20%, if it is to still have sufficient dehydrating effect.

It has also been known to remove pyridine from water by washing with benzol.

In comparison with other constituents of coal tar, crude pyridine is recovered from coal tar in relatively small quantities, and it has, therefore, been usual to distill crude pyridine discontinuously and with steam as the heating agent. However, steam as a heating agent is relatively expensive and its use results in relatively high operating expenses.

It has now been found that by subjecting a water/pyridine mixture which contains more water than the azeotropic composition, to distillation, it is possible to obtain pure water at the base of the column. If, according to the invention, a third constituent, such as soda lye, is added, separation of the water is facilitated. Similarly, the addition of benzol improves the separation of aqueous pyridine by distillation, into pyridine and a mixture of water and pyridine.

According to the present invention, removal of water from crude pyridine is carried out in two distilling columns, one of which is referred to hereinafter as the crude pyridine column and the other as the water column, and in a separator. In carrying out the invention, the water-containing crude pyridine is separated in the crude pyridine column, in a manner known by itself, into a water-free residue of crude pyridine and a head product corresponding approximately to a pyridine-water mixture having a constant boiling point. After condensation and cooling, the head product is mixed in a separating vessel with a substance, such as soda lye and/or benzol, whereby a mainly pyridine-containing layer and a mainly water-containing layer are formed. These layers are then separated from each other and said water-containing layer is supplied to the upper tray of the water column. In said column, separation into pyridine-free water and an azeotropic pyridine-water mixture takes place. This azeotropic mixture, which is the head product of the water column, is condensed together with the head product of the pyridine column, and is cooled and separated into the above mentioned two layers. The mainly pyridine-containing layer formed in the separating vessel is supplied to the upper tray of the pyridine column. The water-free crude pyridine is subjected to continuous or discontinuous fractionation by distillation.

For the separation of the head product of the crude pyridine column, benzol or soda lye, have proved to be particularly effective. However, this separation is still further improved by the simultaneous use of benzol and soda lye, whereby the soda lye displaces pyridine in the water phase, and benzol takes up the pyridine. The consumption of soda lye in the present process amounts to approximately 10% of the quantity required in the known process.

The dehydrated crude pyridine obtained in the present process can be distilled discontinuously or continuously. However, continuous distillation is more advantageous, because it avoids repeated heating and cooling of crude pyridine and its intermediate fractions, and because the danger of decomposition during distillation is also reduced in the continuous process.

In order to obtain a considerable number of sharply defined fractions in a single distillation in which the individual constituents are enriched, according to the invention continuous distillation of the dehydrated crude pyridine takes place in two or more columns. These columns are connected in series, and provided with auxiliary columns, if necessary. By the use of the latter the desired boiling range of the individual fractions can be effectively regulated. While in sharp fractionation the auxiliary columns are operated together with the main columns, in the recovery of fractions having a wider boiling range, one or more of the auxiliary columns can be omitted from the distilling system used. In this manner the number and characteristics of the products to be recovered, can be adapted to market requirements.

As the boiling temperatures of the fractions withdrawn from the first column are relatively low, this column can be operated at approximately atmospheric pressure, without the danger of decomposition. On the other hand, separation of the higher boiling fractions in the second and any following column is carried out under vacuum. As stated above, the crude pyridine is obtained in the production of coal tar or in coke ovens in relatively small quantities. Nevertheless, continuous distillation of the crude pyridine can be carried out economically, if, in accordance with the invention, the columns for water removal and distillation are supplied with the necessary heat from a single special heater, preferably a tube furnace, by one or more heating agents which are conveyed to the sumps of the columns preferably in circulation through the heater. Water under pressure or a high-boiling oil can be used as the heating agent. The simplest procedure is to use the residue of the atmospheric distillation column as the direct heating agent for this column. If desired, it may also be used as indirect heating agent for the remaining columns. In order to utilize the condensed residue of the atmospheric column for heating other columns indirectly by way of a boiler or by a heating coil, the pressure in the second and in the following distilling columns is reduced to such an extent that the boiling point of said residue will exceed the sump temperature in these columns.

The drawing diagrammatically illustrates, by way of example, an apparatus for carrying out the invention.

Through pipe 1 aqueous crude pyridine is fed to an upper tray of pyridine column 2, which is the first column for the removal of water. The water and a certain amount of pyridine escape in the form of vapors from the head of this column and are condensed and cooled in condenser 3. The condensate formed is separated in separator 4 into a pyridine phase and a water phase, after addition through a pipe 5 of a certain quantity of benzol and continuous supply of soda lye. Slight losses of benzol must be replaced from time to time. The benzol-containing pyridine phase is passed through pipe 6 as reflux to the head of pyridine column 2, while the water phase passes through pipe 7 to the head of water column 8. At the bottom of water column 8 water is obtained, which has been extensively freed from pyridine, contains the added soda lye and is discharged through pipe 9. The dehydrated crude pyridine from pyridine column 2 passes through pipe 10 to an intermediate tray of atmospheric distillation column 11. At the head of the column, pyridine vapors escape and are condensed in condenser 12 and in return flow vessel 13. A portion of the pyridine passes as reflux to an upper tray of column 11.

The picoline fraction is obtained at the foot of auxiliary column 14 and the bases having boiling points from about 145 to 180° are recovered at the foot of auxiliary column 15. The residue from atmospheric column 11 is passed through pipe 16 to an intermediate tray of vacuum column 17 which is operated e. g. under a pressure of 80 mm. mercury. Bases having boiling points from about 180°–220°, escape at the head of vacuum column 17, are condensed in condenser 18, and passed to return flow vessel 19, while at the foot of auxiliary column 20 a fraction enriched with quinoline is obtained. From the sump of vacuum column 17 the distillation residue is discharged. The residue of atmospheric column 11 passes and circulates through pipe 21 and tube furnace 22, where it is heated and partially vaporized. The liquid and the vapors flow into distributing pipe 23, from which they are conveyed as heating agents to the various columns. Thus, a portion of the heated residue flows through pipe 24 into the sump of column 11, while another portion passes through pipe 25 to boiler 26 of pyridine column 2 and through pipe 27 to boiler 28 of water column 8. Parts of the heated residue are conveyed through pipes 29, 31, 33 and 35 also to boilers 30, 32, 34, and 36 of the auxiliary column and the vacuum column. After yielding their condensation heat and a portion of their sensible heat, these parts pass through collecting pipes 37 and 38 and through pipes 39 to 42 back to the sump of atmospheric column 11.

By the use of additional columns or lateral columns in the process of the invention the boiling ranges of the products to be recovered can be further narrowed.

We claim:

1. A process for continuous dehydration and fractionation of crude pyridine, comprising in combination the following steps: (a) subjecting crude pyridine to fractional distillation in a first fractionating column in order to obtain a distillation residue consisting of crude pyridine substantially freed from water and an overhead distillate consisting substantially of a constant boiling mixture of pyridine and water; (b) condensing and cooling said overhead distillate, mixing it in a separating vessel with caustic soda lye and benzene simultaneously, and allowing it to separate into a first, predominantly benzene- and pyradine- containing layer and a second, predominantly alkali- and water-containing layer; (c) supplying liquid from said first layer to the upper tray of said first column; (d) supplying liquid from said second layer to the upper tray of a second fractionating column in order to obtain as a distillation residue water and an overhead distillate consisting substantially of a constant boiling mixture of pyridine and water; (e) condensing and introducing said overhead distillate of said second column into said separating vessel and subjecting the resulting dehydrated crude pyridine to fractional distillation.

2. A process as claimed in claim 1, in which fractional distillation of the crude pyridine is carried out in a first fractionating column operated substantially under atmospheric pressure, in combination with a second fractionating column operated under reduced pressure.

3. In a process for dehydration and fractionation of crude pyridine, the step of separating a constant boiling liquid consisting substantially of pyridine and water by mixing said liquid with caustic soda lye and benzene simultaneously and allowing it to stand, to form a predominantly benzene- and pyridine-containing layer and a predominantly alkali- and water-containing layer.

4. A process for dehydration and fractionation of crude pyridine, comprising in combination the following steps: (a) subjecting crude pyridine to fractional distillation in a first fractionating column in order to obtain a distillation residue consisting of crude pyridine substantially freed from water and a distillate consisting substantially of a constant boiling mixture of pyridine and water; (b) condensing and cooling said distillate, mixing it in a separating vessel with at least one substance selected from the group of caustic soda lye and benzene, and allowing it to separate into a first, predominantly pyridine-containing layer and a second, predominantly water-containing layer; (c) supplying liquid from said first layer to said first fractionating column; (d) supplying liquid from said second layer to a second fractionating column in order to obtain as a distillation residue water and a distillate consisting substantially of a constant boiling mixture of pyridine and water; (e) condensing and introducing said distillate of said second column into said separating vessel.

5. A process as claimed in claim 4, in which heating means circulating through at least one heater, are supplied to the materials to be dehydrated and fractionated.

6. A process for continuous dehydration and fractionation of crude pyridine-water mixtures, comprising in combination subjecting a crude pyridine-water mixture to fractional distillation in a first fractionating column in order to obtain a distillation residue consisting of crude pyridine substantially freed from water and a first distillate substantially consisting of a constant boiling mixture of pyridine and water; condensing and cooling said distillate, mixing it with at least one substance selected from the group of aqueous NaOH solution and benzene and allowing it to separate into a first predominantly pyridine-containing layer and a second predominantly water-containing layer; introducing liquid from said first layer to said first fractionating column; introducing liquid from said second layer containing NaOH into a second fractionating column in order to obtain as a distillation residue an aqueous NaOH solution and a distillate consisting substantially of a constant-boiling mixture of pyridine and water and processing this distillate together with the distillate from the first fractionating column.

References Cited in the file of this patent

UNITED STATES PATENTS

| | | |
|---|---|---|
| 68,426 | Everest | Sept. 3, 1867 |
| 1,290,124 | Downs | Jan. 7, 1919 |
| 1,416,205 | Huff | May 16, 1922 |
| 1,416,206 | Huff | May 16, 1922 |
| 2,058,435 | Fisher | Oct. 27, 1936 |
| 2,224,926 | Potts et al. | Dec. 17, 1940 |
| 2,454,447 | Harney et al. | Nov. 23, 1948 |
| 2,521,766 | White et al. | Sept. 12, 1950 |

OTHER REFERENCES

Industrial and Engineering Chemistry, June 1945, vol. 37 No. 6, pages 585–587.